United States Patent [19]

Arledter et al.

[11] 4,205,097

[45] May 27, 1980

[54] PROCESS FOR THE THERMAL POLYMERIZATION, POLYCONDENSATION OR CONDENSATION OF MONOMERIC SYNTHETIC-RESIN MATERIALS IN POROUS WORKPIECES

[76] Inventors: Hanns F. Arledter, Andritzer Reichsstrasse 122, Graz, Austria, A-8010; Werner Mehl, Badgasse 4, Mödling, Austria, A-2340

[21] Appl. No.: 886,612

[22] Filed: Mar. 14, 1978

[30] Foreign Application Priority Data

Mar. 16, 1977 [DE] Fed. Rep. of Germany ....... 2711478

[51] Int. Cl.² .......................... B05D 3/06; B05D 3/02
[52] U.S. Cl. .................................... 427/44; 427/54.1; 427/336; 427/381; 427/393
[58] Field of Search ............... 427/391, 393, 340, 341, 427/342, 336, 44, 54, 381

[56] References Cited

U.S. PATENT DOCUMENTS

| | | | |
|---|---|---|---|
| 2,116,318 | 5/1938 | Miles | 427/391 X |
| 2,516,064 | 7/1950 | Marks | 260/86.1 |
| 2,517,698 | 8/1950 | Muskat | 427/391 X |
| 2,631,955 | 3/1953 | Muskat | 427/391 X |
| 3,380,980 | 4/1968 | Calkins et al. | 260/89.5 |

FOREIGN PATENT DOCUMENTS

| | | | |
|---|---|---|---|
| 2111149 | 9/1971 | Fed. Rep. of Germany | 427/391 |
| 694690 | 12/1930 | France | 427/391 |
| 46-14838 | 4/1971 | Japan | 427/391 |
| 46-14839 | 4/1971 | Japan | 427/391 |

OTHER PUBLICATIONS

Beall, F. C. et al., *Direct & RF Heating Caring of Wood—Plastic Composites,* Forest Products Journal, vol. 16, No. 9. Sep. 1966, SDIF 56, pp. 99–106.

*Primary Examiner*—Michael R. Lusignan
*Attorney, Agent, or Firm*—Karl F. Ross

[57] ABSTRACT

A thermal polymerization of monomeric materials in a porous workpiece such as wood is carried out using a temperature-controlling or heat-carrying agent. The controlled heat supply for developing the threshold temperature for an exothermic reaction or for supplying the heat for an endothermic chemical reaction and for removal of excess heat in exothermic reactions is effected by water whose addition in small quantities is not detrimental to the workpiece or the reactions.

22 Claims, 1 Drawing Figure

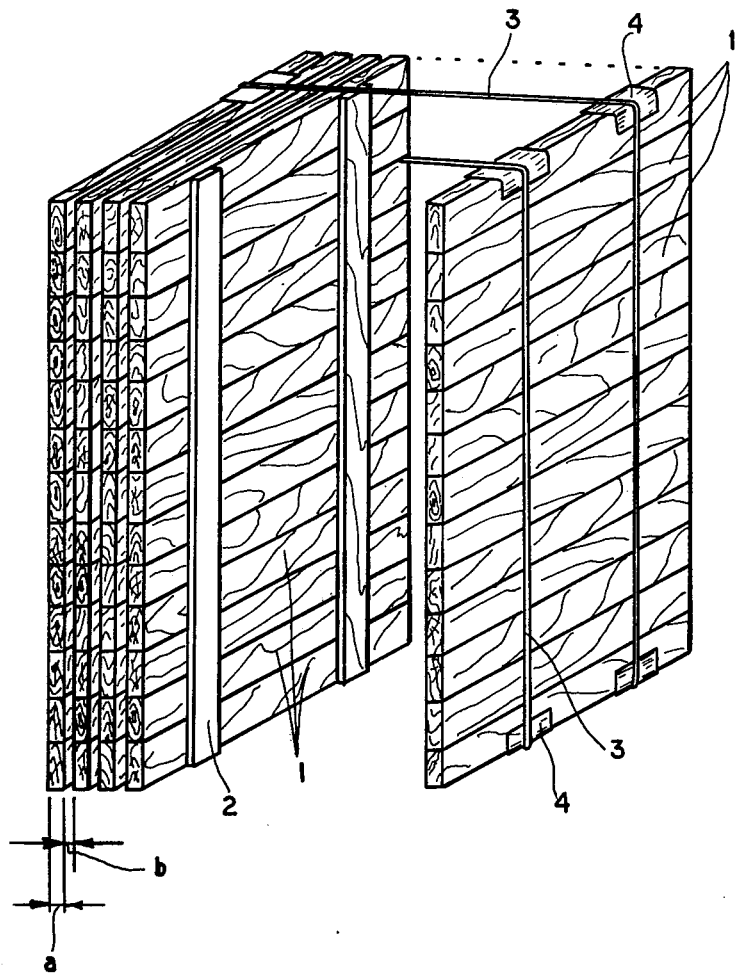

4,205,097

PROCESS FOR THE THERMAL POLYMERIZATION, POLYCONDENSATION OR CONDENSATION OF MONOMERIC SYNTHETIC-RESIN MATERIALS IN POROUS WORKPIECES

FIELD OF THE INVENTION

The present invention relates to a process for the polymerization or condensation of monomeric materials or condensable materials in porous workpieces and, more particularly, to a process for the polymerization, polycondensation or condensation of monomeric or other synthetic-resin precursors in porous workpieces, especially wood.

BACKGROUND OF THE INVENTION

It is desirable in the fabrication of composite materials, e.g. those of chipboard, fiberboard, particle board, wood laminates, plywood and the like to provide thermally activatable synthetic-resin precursors which are polymerized, polycondensed or condensed to form binders or bonding agents.

It is also known to use synthetic-resin precursors usually vinylic monomers in impregnating solutions for individual pieces of wood, assemblies of wood pieces or the like and to effect thermal polymerization, condensation or polycondensation in situ by heating the wood body impregnated with the monomeric solution. In the thermal polymerization of synthetic-resin precursors, especially in wood, the selection of the heat carrier plays an important role since this heat carrier is used for a number of purposes. For example, in the case of exothermic polymerization reactions, it may serve to bring the system to the threshold temperature at which the reaction is initiated. In the case of endothermic reactions, it may provide the necessary thermal energy for maintaining the reaction. Also in the case of exothermic reactions, it may serve as the agent for carrying away excess thermal energy.

Not all heat carriers are effective for all purposes as will be apparent hereinafter. Gaseous heat carriers have been found to effect heat exchange so slowly that the reactions require many hours, a significant technological disadvantage.

To improve the heat transfer efficiency, it has already been proposed to effect thermal polymerization with impregnated wood using a liquid heat carrier. Even here, however, problems have been discerned with selection of the heat-transfer agent. For example, oil (see French Patent FR-PS 694,690) has the disadvantage that it mixes with the low-viscosity monomeric materials at temperatures of 60° to 100° C. or solubilizes the monomers wherever they are accessible to the oil through the pores of the workpiece.

Because of thermal expansion and contraction effects and density changes during the polymerization (the specific gravity of the monomer changes from about 0.91 g/cm$^3$ to 1.15 g/cm$^3$ in the transformation to the polymer), there is a reduction in the volume of the polymer wood and a penetration into the pores thereof formed during the shrinkage of the polymer. As a result, there are unpredictable, nonuniform, partly irreversible physical and chemical changes in the surfaces of the workpiece resulting in discoloration and inhomogeneities which may require a time-consuming and expensive surface treatment process, e.g. organic-solvent washing, or sanding and other abrading operations which result in high losses of the polymer wood.

The use of metal alloy melts (Japanese Patent JA-PS 711 48 39) have also been proposed but are disadvantageous at temperature ranges of 60° and 100° C. The metal alloys of tin, antimony, bismuth, lead and zinc are very expensive. Their vapors are toxic and require special measures for environmental protection.

At temperatures of 60° C. to 100° C., the viscosity of these metal alloys is relatively high and it is therefore energy-expensive to recirculate the medium to the satisfactory degree. Furthermore, when the impregnated wood substrate is introduced in a cold state into a bath of the alloy, a surface cooling of the bath is extremely inconvenient so that measures must be taken to prevent such phenomena.

Finally, in this connection, it should be noted that the immersion of the impregnated wood substrate in the hot melt results in the displacement of monomer components into the metal bath from the impregnated substrate which causes the pickup of impurities by the bath at the wood surface and a time-consuming and costly cleaning process.

It has already been proposed to use aqueous solutions as heat carriers (see German open application - Offenlegungsschrift—2 111 149). Such systems are always employed at the highest possible viscosity since it has been the assumption that only in this way it is possible to prevent the penetration of the heat carrier into the workpiece and the expulsion of the monomers therein.

The handling of such high-viscosity solutions, usually sodium alginate, water glass and glycerine, is difficult. The workpieces of wood or like materials must be introduced into the treating solution with relatively large spacings so that all surfaces will come into contact with the solution in spite of its high viscosity. Should a portion of the solution be vaporized, the resulting boilup gives rise to a foam development which is disadvantageous to the operating personnel. Finally, it is expensive and inconvenient to remove the residues of such viscous materials from the workpieces after polymerization has been effected to the desired degree.

OBJECTS OF THE INVENTION

It is the principal object of the present invention to provide a process for the thermal polymerization of polymerizable synthetic-resin precursors which avoids the disadvantages of the earlier systems.

Yet another object of the invention is to provide a method of polymerizing, condensing or polycondensing monomeric materials impregnated into wood which will reduce the expense and time of after-treatment, will permit the polymerization reaction to be carried out at a high speed, and will reduce the cost.

Still another object of the invention is to provide a process for the thermal polymerization of synthetic resin precursors impregnated into wood workpieces which can be carried out with a minimum danger to the health of the operating personnel and to the environment.

SUMMARY OF THE INVENTION

The present invention provides a process for the thermal polymerization, polycondensation or condensation of monomeric synthetic resins (generally, synthetic-resin precursors) in porous workpieces, especially wood, whereby the controlled heat supply for raising the temperature of an exothermic reaction to its threshold, for carrying away excess heat in an exothermic reaction or for supplying the thermal energy for an endothermic reaction is effected by an aqueous heat carrier which is contacted with the impregnated workpiece in a liquid state. According to the invention the heat carrier consists at least predominantly of water and has a viscosity of at most 3 cp.

The expression "at least predominantly water" is intended to define a heat carrier which contains over 50% water but which may be up to 100% water. Thus the polymerization can be effected simply in water although additives to the water can be used as well when such use is advantageous and does not detract from the advantageous gain by the use of the predominantly aqueous system.

Water has the advantage of low cost and environmentally safe properties and, in addition, has been found to be surprisingly satisfactory at extremely low viscosity when the impregnant in the wood is a vinylic system.

We have found that the use of water is advantageous in that the most important vinylic monomers and polymers (styrene, methyl acrylate) which can be used in the impregnant are insoluble or of low solubility in water so that this heat carrier does not tend to solubilize the impregnant from the wood.

When traces of the vinylic monomer are picked up by the water, they tend to polymerize therein and thus allow recovery from the water. As a consequence, the discharge of environmental contaminants is reduced.

When water does pentrate into the surface of the workpiece, by contrast with other heat carriers of the type described previously, it can be driven off by evaporation without any residue formation which may be detrimental to the quality of the product.

A most important aspect of our discovery is that the fear of penetration of a low viscosity heat carrier, such as water, into the workpieces, during the thermal polymerization operation is groundless. While we are not fully certain as to the reason why water of the low viscosity described above is suitable for this purpose, we believe that the pores of the workpiece are so rapidly closed by the polymerization operation that any penetration of the heat carrier after the first 15 minutes of the treatment is excluded. The water which may penetrate during the first 15 minutes of the polymerization process can be removed as noted above without disadvantage.

The material exchange at the boundary layer of the heat-carrier/workpiece interface is a function predominantly of the penetration into the capillary system, especially in the case of wood or pressed wood material such as Eternit, such penetration being a factor of $10^2$ to $10^3$ more rapid than the diffusion of liquid or the penetration of water vapor into the usual surface. In order to evaluate the limitation on the penetration of the heat carrier into the workpiece, the restriction on removal of the monomer therefrom, etc. only the penetration process through the pores of the workpiece need be considered.

The movement of liquids in capillaries is treated in terms of the total velocity v (cm/sec) which is given by the formula $$v = \Delta p / 4\eta \cdot \Delta l \, (r_o^2 - r^2)$$

The quantity Q (cm³/sec) of liquid which passes through the capillary system is defined as $$V/t = Q = \pi r^4 \Delta p / 8\eta \Delta l = r_o^2 \pi (\Delta p \cdot r_o^2 / 4l \cdot 8\eta)$$

The path length l and the input and output time factor (s) are determined by the following relationship:

$$t = 4\pi \cdot l^2 / \sigma \cdot \cos\lambda \cdot d$$

$$l = t \cdot \sigma \cdot \cos\lambda \cdot d / 4\eta$$

In the foregoing
$\Delta p = p_1 - p_2$ pressure drop between the 2 points 1 and 2
$\Delta l$ = the path length between points 1 and 2
$\eta$ = viscosity in cp = 0.001 m$^{-1}$s$^{-1}$kg
$r_o$ = radius of the capillaries
$\sigma$ = surface tension
$\lambda$ = edge angle The viscosity $\eta$ of the heat carrier, which is a function of temperature, is inversely proportional to the penetrating quantity of liquid into the free openings.

The disadvantages which have hitherto been considered to be a characteristic of water as a heat carrier can be readily seen from the foregoing formulas which make it appear that a low viscosity and high surface tension will result in an extremely high penetration of the heat carrier into the capillaries.

With the system of the present invention, however, the problems which could be predicted simply do not arise. Firstly, the impregnation can be carried out to the degree that practically all of the pores are filled to a maximum and thereby prevent further penetration of water into these pores filled with the water-insoluble impregnant. Since the monomers are not removed by solubilization from the pores, penetration can be avoided.

The monomeric component, however, may be designed such that there is a minimum shrinkage on polymerization so that portions of the pores are not unblocked to allow water penetration.

It has been found to be advantageous, moreover, to increase the pH value of the heat carrier, a step which reduces the pore cross sections and again the penetration of the heat carrier. From the foregoing formulas, moreover, it will be apparent that the driving force for penetration of the liquid into the wood or for emergence of the liquid from the wood, which is a function of the differential pressure $p_1$ and $p_2$, should be held as low as possible. The formulas also show that one can control the surface tension $\sigma$ and the edge angle $\lambda$ by the addition of additives to the impregnating solution or the heat carrier so as to minimize the penetration of the latter by reducing the driving force.

According to the process of the present invention, the time in which the pores of the edges of the workpiece are sealed by polymerization of the impregnant should be minimized to reduce penetration.

A significant role in reducing the polymerization time is, of course, played by the temperture of the heat carrier and a high temperature of the heat carrier can result in a high temperature differential for raising the temperature of the edge regions of the workpiece and hence the speed with which the boundary regions are sealed.

While it has been found to be most advantageous to carry out the process with water as a heat carrier at a temperature of 88°–92° C., still higher temperatures can be used to effect the sealing of the boundary regions.

Table I below gives the time in which the boundary region of an impregnated wood workpiece reaches the indicated temperature at the depth stated when water at a temperature of 88° to 92° C. is used as the heating liquid.

TABLE I

| Boundary Region (depth) | Time to reach a temperature of | | |
|---|---|---|---|
| | 75° C. | 80° C. | 85° C. |
| 1 mm | 45 sec | 60 sec | 75 sec |
| 2 mm | 55 sec | 90 sec | 120 sec |
| 3 mm | 60 sec | 120 sec | 180 sec |

As the threshold temperature is lower for initiation of the reaction and/or the viscosity of the monomers in the wood is increased, gelation in the boundary zone of the wood is achieved sooner and thus the monomer losses are reduced.

The monomer loss upon polymerization in water can be easily determined when the polymerizable synthetic-resin precursors form synthetic resins which rise to the surface of the water and form a synthetic layer therein. All that is necessary, in this case, is the removal of the synthetic-resin layer and the determination of the proportion constituted thereby of the theoretical level of synthetic resin in the wood.

Table II below gives the monomer separation per

TABLE II

| Minutes to Viscosity Increase of Monomers to above 10 cps | Minutes to Attainment of the Gelpoint of 80° C. | Separation of Monomers in grams per 50 kg of Polymer in the Polymer Wood |
|---|---|---|
| 10 minutes | 19 minutes + | 180 gr + |
| 7 minutes | 9 minutes + | 150 gr |
| (3) minutes | 6 minutes + | 80 gr |
| | 5 minutes + | 40 gr |
| 2½ minutes | 4 minutes + | 30 gr |
| 2 | 2.2 minutes + | (20 gr) |

The catalyst selection allows the establishment of an optimum polymerization and hardening of the impregnant mixture. The quantity of catalyst will usually be determined by the quantity of inhibitors which may be present, the temperature and the duration of polymerization which can range between 1 and 3%. Each catalyst has a predetermined threshold temperature and is effective only at temperatures above this threshold. The catalyst also has a half life, i.e. an active period corresponding to that at which half of the peroxide molecules decomposes. The half life temperatures of the various catalysts which may be used in accordance with the present invention and their threshold temperatures are as follows:

TABLE III

| No. | Chemical Designation | Peroxide Class | Decomposition temperature in min. | Threshold temperature | Storage Time at room temperature | SADT |
|---|---|---|---|---|---|---|
| P1658 | Bis-(4-t-Butylcyclohexyl)peroxidecarbonate | Acrylic | 90° C. | 50° C. | hours-days | 45° C. |
| LP | Dilauroyl-peroxide | Acrylic | — | 60° C. | days (weeks) | ca.50° C. |
| BP50 | Dibenzoyl-peroxide | Acrylic | 133° C. | 70° C. | days (weeks) | ca.50°-65° C. |
| P1310 | t-Butylperethylhexonate | Ester | 124° C. | 75° C. | days (weeks) | — |
| P1293P | 2,2-Bis-t-Butylperoxide | Catal | 168° C. | 82°-85° C. | Weeks->months | 55° C. |
| T BPB | t-Butylperbenzoate | Ester | 163° C. | 95° C. | weeks->months | 80° C. |

TABLE IV

| | | THRESHOLD TEMP. | HALFLIFE TIME OF | | | TEMPERATURE FOR A HALFLIFE TIME IN HOURS | | | | | | |
|---|---|---|---|---|---|---|---|---|---|---|---|---|
| | | | 600 Min. | 60 Min. | 1 Min. | 50° C. | 60° C. | 70° C. | 80° C. | 90° C. | 100° C. | 110° C. |
| Bis-(4-t-butylcyclohexyl)-peroxide | P-1658 | 50° C. | 40° C. | 56° C. | 90° C. | 2.2 | 0.5 | 0.2 | — | — | — | — |
| Di-t-butylperpivalate | | 52° C. | 55 | 73 | 110 | 23 | 6 | 1.9 | 0.6 | — | — | — |
| Didecanoylperoxide | | 60° C. | 62 | 80 | 120 | 67 | 13 | 3.5 | 1.0 | 0.3 | — | — |
| Dilauroylperoxide | LP | 60° C. | 62 | 80 | 120 | 58 | 14 | 3.7 | 1.0 | 0.3 | — | — |
| Dibenzoylperoxide | BP 50 | 70° C. | 72 | 80 | 130 | — | 19 | 7.0 | 2.5 | 1.0 | 0.4 | — |
| T-butyl-peroctoate | P-1310 | 75° C. | 76 | 92 | 130 | — | 140 | 28 | 5.7 | 1.4 | 0.4 | — |
| 2,2-Bis-(t-butylperoxide)-butane | P-1200 P-1293 | 85° C. | 103 | 125 | 170 | — | — | — | — | 55 | 16 (1.6 at 120° C.) | 4.8 | charge with 48 pieces of wood (30 kg of wood) containing 18 kg of the monomer mixture. The tests were carried out with the same monomer mixtures using polymerization in water and the optimum selection of catalyst type and quantity for the fastest viscosity increase or gelation of the monomers in the boundary zone (first 1 to 3 mm depth) of the workpieces.

The gelpoint of catalized monomers and mixtures of unsaturated polyester compounds at temperatures of 70° to 85° C. is only dependent upon the quantity of catalyst added with the lowest threshold temperature and is independent of the quantities of catalysts with higher threshold temperatures.

The gelpoint is only an indication of accomplished gelation. Of greater importance is the viscosity increase and the time of attainment of a viscosity above 10 cps at a temperature of 80° C. in the boundary zones of the wood to limit the release of monomers from the wood and penetration of water into the wood.

The addition of limited quantities of catalysts of low threshold temperature to standard catalyst mixtures of high threshold temperature affects the time to attainment of a viscosity increase from 1 cps to 10 cps and to attainment of the gelpoint (1000 cps and more) vary greatly as can be seen from the following table:

TABLE V

| Catalyst Mixture: 0.4% LP + 1% BP50 + 0.7% 1293 + x% 1658 | | |
|---|---|---|
| Catalyst % added of 1658 (Bis-4-t-butyl-cyclohexyl-peroxide) | Time in Minutes to Viscosity Increase from 1 cp to 10 cps | Time to Gelpoint 85° C. (2000 cps +) |
| 0 | 12–15 | 15–22 |
| 0.12 | 5 | 7–8 |
| 0.25 | 3–3½ | 5½–6 |
| 0.33 | 2½ | 4 |
| 0.5 | 2 | 2½–3 |

Using a water bath at a temperature of 85° to 90° C., the viscosity increase (to 10 cps) of the monomers in wood can be effected after an immersion of 2½ to 4 minutes in the boundary zone. This is half to two thirds of the gel time at 85° C. With a reduced bath temperature, for example 80° C., the gel time increases sharply (see the foregoing table) while the viscosity-increase time is correspondingly increased so that the duration will be 6 to 10 minutes or more.

Apart from the duration of catalysts, the gel temperature and time for the monomer solution can be reduced by adding to the impregnating solution, monomeric styrene, MMA and other high reactive unsaturated polyesters in quantities of 5 to 50% by weight. The effect of the amount of the unsaturated polyester in styrene on the gelpoint using the same amount of catalyst (1.0% LP+2% BP50+0.8% 1293 P) is given in Table VI below.

TABLE VI

| | 85% Gelpoint |
|---|---|
| 100% styrene | 2000" |
| 85% styrene + 15% H260 | 540" |
| 80% styrene + 20% H260 | 420" |
| 75% styrene + 25% H260 | 300" |

The same effect is obtained with the addition of 3 to 10% of cross-linking by functional monomers such as divinylbenzene, allyl methacrylate or 1,4-butanediol-dimethacrylate, these compounds condensing with the monomers of the impregnating solution.

An important difference between the invention and the state of the art is that the viscosity of the heat carrier with which the impregnated wood is contacted is as low as possible and is as close as possible to that of pure water. The aqueous heat carrier allows a higher packing density of the wood bodies in the impregnating vessel, eliminates the danger of boilover, and produces a product which does not have to be washed off to form a clean surface. For the reasons stated, the penetration of the heat carrier into the wood does not pose a significant problem.

However, a slight increase of the viscosity of the heat carrier relative to that of pure water may be advantageous in some cases and can serve to reduce the temperture sensitivity of the heat carrier which has a tendency to vary its viscosity with temperature. In other words, a viscosity modifier can be added to the water in small quantities and with slight effect so that at all treatment temperatures the viscosity will be the same. The viscosity modifier can be a viscosity increasing solvent such as a carboxyvinyl or polyoxyethylene polymers with molecular weights in excess of one million. The viscosity modifier can be added in amounts up to 0.5% by weight of the heat carrier (water) to raise the viscosity to about 2 cps at 85° to 90° C.

According to the invention, moreover, additives can be supplied to the impregnant to raise the surface tension of the monomer solution relative to that of water, thereby reducing the penetration of water into the pores of the wood still further. Suitable additives for this purpose include waxes such as paraffins which may be introduced into the monomer solution to the limit of solubility of the paraffins therein.

It has been found to be advantageous, in some cases, to expedite the sealing of the pores of the wood still further by adding accelerators to the heat carrier. These accelerators are intended to increase the rate of polymerization in the boundary zones of the workpiece and thus enable polymerization in these zones to be effected more rapidly than in the interior of the wood body. These accelerators can be chemical accelerators. A similar effect can be accomplished by spraying or dipping the wood, after impregnation, into an accelerator, subjecting the wood to high-energy radiation sufficient to promote superficial polymerization before immersing the impregnated wood into the aqueous heat carrier, or even sealing the surface of the wood and at least partially blocking the pores with a lacquer or the like.

When it is necessary or desirable to operate with a higher temperature of the aqueous heat carrier, it is possible to raise the boiling point thereof by the addition of salts, especially LiCl, NH$_4$Cl, MgCl$_2$, CaCl$_2$, MgSO$_4$. These salts can be added in amounts sufficient to raise the boiling point of the heat carrier of 105° to 100° C.

BRIEF DESCRIPTION OF THE DRAWING

The above and other objects, features and advantages of the present invention will become more readily apparent from the following description, reference being made to the accompanying drawing the sole FIGURE of which is a diagrammatic illustration of a stack of wood workpieces to be treated in accordance with the present invention.

SPECIFIC DESCRIPTION AND EXAMPLES

In the drawing, there is shown a preferred mode of impregnating pieces of wood in accordance with the present invention. The wood baulks, sheets or beams 1 are joined together in planar arrays with spacers 2 disposed between them, the planar arrays being held together, in turn, by steel bands 3 into a completed package. Protective strips 4 are interposed between the steel bands and the wood where the steel bands pass around the edges of the package.

The entire package is subjected to impregnation with a synthetic-resin solution which penetrates the full depth a of the wood and passes into the spaces b of the package. The impregnating solution is then drained away and the package is immersed in the aqueous medium at a temperature of 85° C. or above and with a viscosity of up to 3 cps for a period sufficient to effect thermal polymerization of the impregnant.

EXAMPLE 1

360 planes beech boards (940 mm×70 mm) with a wood volume of (1800×360) 650 liters and an aqueous weight of (1.2 kg×360) 430 kg were bounded in a package as shown in the drawing with a spacing of 5 mm. The package had dimensions of 940 mm in length, 960 mm in width and 840 mm in height (30×12 planar rows of board) using two steel bands with protective layers 4 in the manner described. The thickness a of the boards was about 30 mm and the spacing b about 5 mm as noted. The package or bundle of boards was placed in a net or basket of metal netting and was introduced into an impregnating vessel of internal dimensions of 1000 mm×1000 mm×1100 mm by a crane. The bundle was retained in place in the impregnating vessel of a pair of edge clamps and respective screws so that it could not float.

The impregnating vessel, on wheels was rolled along tracks into a vacuum-pressure vessel or autoclave. After evacuation of the impregnating vessel for 15 minutes at 6 to 10 Torr., 430 liters of filtered impregnating solution at a temperature of 5° to 15° C. is introduced into the impregnating vessel. About 250 kg (265 liters) of the solution is absorbed by the wood.

Impregnation is carried out for 30 to 60 minutes at 2 to 6 atm gauge. The weight of the impregnated wood is then 680 kg. The remaining approximately 175 liters (−200) of impregnating solution is then pumped or forced back into its cooled supply vessel.

The impregnated wood bundle is then lifted by the crane out of the vessel and can be introduced, after replacement of the carrying sling, in the water polymerization vessel. When the gelling characteristics of the solution are optimal, it will gel rapidly at a temperature of 85° to 90° C. Should it be desired to reduce penetration beyond that obtained by rapid gelation of the resin mixture, it is possible at this point to seal the end faces of the wood by coating it with a high-catalyst accelerating solution of 60% polyester +40% styrene as the resin components, the solvent and 3% catalyst and 2% accelerator. The surfaces may also be sealed with a nitrolacquer containing 5% accelerator.

After polymerization is complete, the wood bundle is removed from the water bath, drained and dried. No surface cleaning is required and the leaching of the monomeric component from the pores is minimal.

The monomeric impregnating solution consisted of 75 to 90% by weight styrene, 10 to 25% by weight unsaturated polyesters to 10 to 20% by weight divinylbenzene, 0.2 to 0.36% by weight bis-(4-t-butylcyclohexyl)peroxydicarbonate (P 1658), 0.4 to 0.6% by weight dilauroylperoxide, 0.6 to 0.8% by weight dibenzoylperoxide (BP-99), and 0.4 to 0.6% by weight 2,2-bis-t-butylperoxy)butane (P 1298 P). 0.3% by weight of a pigment or coloring agent may also be added.

Using the coloring agent, the monomer solution has the following gelpoints:

TABLE VII

| Gelpoint 70° C. | 8½–10 Minutes |
|---|---|
| Gelpoint 75° C. | 6–6¼ Minutes |
| Gelpoint 80° C. | 4–5 Minutes |
| Gelpoint 85° C. | 3–4 Minutes |
| Gelpoint 90° C. | 2¼–2¾ Minutes |

The hot water polymerization is carried out in an upwardly open vessel with dimensions of 1250 mm×1250 mm×1250 mm (2000 liters volume) which is heated indirectly (2 to 4 m² of indirect heating wall surface) and which also can be cooled. A variable speed stirrer is mounted at the bottom to promote heat exchange. The vessel is designed so that 1000 to 2000 kcal of thermal energy can be transferred to the water per minute.

The gelling or viscosity increase of the monomer solution in the impregnated wood is effected in the times given in the accompanying table when polymerization is carried out in 1200 liters of water having a pH of 9 and a starting temperature of 92° to 94° C. By heat transfer to the immersed wood (20° C.) the temperature sinks in a period of 1 to 4 minutes to 87° C.

TABLE VIII

| Edge Zone Thickness | Viscosity Increase 10 cps | Gelation at 1000 cps+ |
|---|---|---|
| 1–2 mm | 2–3 minutes | 3–4 minutes |
| 3 mm | 3½ minutes | 5–6 minutes |
| 4 mm | 5 minutes | 7–8 minutes |
| 5 mm | 7 minutes | 10–11 minutes |
| 13 mm | 14–15 minutes | 18–19 minutes. |

The edge sealing is effected to a depth of 3 mm in the wood in a period of 3 to 6 minutes.

After gelation in the edge zone (first 3 mm of depth), which is effected at a temperature of 87° to 89° C., polymerization continues for a period of 15 to 20 minutes as the temperature drops to 85° C., heat being supplied, if necessary, to prevent the water bath from reaching a lower temperature. For most effective temperature distribution in the polymerization vessel, the agitator is turned on. After 15 to 20 minutes, a strong exothermic reaction is noticeable in the wood and supplies to the water a quantity of heat of about 17000 kcal (2500 mol×0.40×16.0 kcal/mol).

This exothermically generated heat raises the water temperature to about 90° to 92° C. (1200 l×1.0×7° C.).

To prevent overheating of the wood at local boiling, excess heat beyond the 540 kcal/mole of the latent heat of vaporization, may have to be abstracted. Boiling of the water is in any event avoided by cooling, if necessary, to maintain a uniform process.

Polymerization is complete after a reaction period in the water of 33 to 35 minutes, the temperature within the wood reaching a peak of about 125° to 140° C. The wood bundle is removed from the water after 36 to 38 minutes and is rapidly introduced into a chamber which is thermally insulated and has dimensions of 1000 mm×1000 mm×1000 mm. The bundle is stored to permit equilibration of the wood and the temperature thereof, as measured on the external surface, drops in a period of 2 to 3 hours to about 85° C. during a hardening phase. The polymer wood requires no cleaning and is free from surface defects.

The beech polymer wood described above has a BARCOLL hardness of 86 to 89 and even the ends of the board in the edge zones of 1 to 2 mm most prone to water penetration have a Barcoll hardness of 81 to 84, any discoloration being limited to a depth of a maximum of 3 mm.

Resin separation from the boards amounts to between 90 to 180 g for 650 kg of the polymer wood. This is about 0.045 to 0.07% referred to the 250 kg of the starting monomer solution in the wood or about 0.25 to 0.50 g/board. Thus even in the edge zones the loss of the monomer is at most 30%.

The polymerization is carried out with only a minimum of externally supplied energy since 17000 kcal are exothermically produced and the heating of 650 kg of the polymer wood from 20° C. to an average of 130° C. requires only 2700 kcal (680×0.36×110° C.). The monomer loss in total can be limited to less than 0.5%.

The packing density of the wood bundle amounts to:

| | |
|---|---|
| External Dimensions of the Wood Bundle — 940 × 960 × 840 = | 760 l |
| Volume of the Impregnated Wood | 650 l |
| free space in the bundle | 110 l |
| packing density = $\frac{650 \cdot 100}{760}$ = 85% | |

Such high packing density permits the use of small receptacles and reduces the consumption of monomer solution. The cooling supply and treatment vessels are thus all of reduced size. The apparatus required for carrying out the process of the present invention can be of relatively low capital cost and small dimensions.

The proportion of consumed monomer solution per charge (265 liters) with respect to the starting quantity (420 liters) is extraordinarily advantageous since only 155 liters (37%) of a monomer residue solution need be handled.

The production capacity of the apparatus is high and in 9 hours some 6 wood charges can be processed, each with 680 kg of polymer wood. The output is thus between 4 and 12 tons per day depending upon the number of shifts operated.

EXAMPLE 2

Production of Beech Polymer Wood with Enrichment of the Monomers with Polyesters and Catalysts at the End Zones of the Wood A 430 kg wood bundle (beech) made as described in Example 1 is evacuated and impregnated with 420 liters of an impregnating solution I at 15° C. The impregnating solution I consists essentially of:
15.0%—VIAPAL 452 polyester;
83.5%—Styrene;
0.15%—1658;
0.30%—LP;
1.0%—BP 50;
0.6%—1293 P.

This solution had a gelpoint of 8 to 9 minutes at 85° C. and a viscosity of 1.3 cps at 21° C. and 0.6 cp at 80° C.

After the wood was in contact with the impregnating solution for 5 to 10 minutes, 250 liters of the solution was taken up by the wood. This constituted 90 to 95% of the quantity of the impregnating solution which was picked up over a period of days at 5° C.

The remaining approximately 160 liters of the monomer solution was then combined with 26 kg of unsaturated polyester H452, 300 g of 1658 and 0.3% LP, the mixing being effected by pumped recirculation of the monomer solution. The homogenized monomer solution then contained about 30% H 452, 0.4% of 1658, 0.6% LP, 1.0% BP 50 and 0.6% 1293. The viscosity of the solution at 20° C. was about 3.5 cps and 1.2 cp at 80° C. The gelpoint at 85° C. was 2.5 minutes, the shelf life was about 12 to 24 hours at room temperature but 48 hours at 5 to 10° C.

The impregnation of the wood was carried out at a pressure of 2 to 6 atm gauge for 20 to 40 minutes whereupon the wood picked up a further 20 to 25 liters of this highly catalized solution. The total impregnation of the wood required 265 liters of solution.

The remaining 160 liters of solution was then replenished with styrene, H 452 and catalyst for the next charge (i.e. given the composition of solution I above). This technique permitted only the outer zones of the impregnated wood to be charged to a depth of 4 to 10 mm with the higher viscosity, rapidly polymerizing monomer solution. This sealing treatment did not interfere with the penetration of the less viscous solution into the interior of the wood. When polymerized, the edge zone sealed itself so rapidly that there was practically no losses of the monomer solution. To maintain the surface of the boards free from the high viscosity mixture prior to polymerization, the boards were washed in styrene briefly and then immersed in water for the polymerization step as described in Example 1.

EXAMPLE 3

Production of thin polymer wood lamallae

2–20 lamallae of wood having a thickness of 2–6 mm. each and a width of 2–10 mm. are stacked and tied together with 1–3 thin elastic bands (1 mm. thick) separated by foils of e.g. aluminum of the size of the lamallae. Each bundle had a thickness of 20–40 mm. The lamallae bundles were then stacked and treated as the boards of Example 1.

EXAMPLE 4

Production of 3.5 mm. flooring lamallae 8 beech lamallae of a thickness of 3.5 mm., a width of 70 mm. and a length of 500 mm. were bundled with separation by an aluminum foil, paper or synthetic resin foil (viscose) folded in an accordion pleat so that the bundle had a length of 500 mm., a width of 70 mm. and a height of 28 mm. The wood weight per bundle was 640 g. and the wood volume 1000 ml.

14 of these lamallae bundles were placed side by side along their longitudinal sides and spaced apart by aluminum spacers of a width of 8 mm. and a height of 6 mm. The entire stack was tied together with two metal straps as described for the bundle of Example 1 and as shown in the drawing so that the total packet had approximately the same dimension as that of Example 1 with the weight of about 250 kg.

Two such bundles, with dimensions each of 500 mm.×980 mm.×940 mm. were placed in the impregnating vessel which had internal dimensions of 1050 mm.×1050 mm.×1050 mm. The impregnating vessel was then introduced into the pressure/vacuum chamber. After evacuation for 15 minutes at 10 Torr, an impregnating solution was introduced. The impregnating solution consisted of: about 74% by weight methyl methacrylate, about 10% by weight butanedioldimethacrylate, about 15% by weight unsaturated polyester (Viapal 475) balance a catalyst system consisting of 0.35 part by weight, bis-(4-t-butylcyclohexlperoxide)-dicarbonate. 1 part by weight lauroyl peroxide and 1 part by weight benzoyl peroxide.

The solution had a gelpoint of 5 minutes at 75° C.–80° C. The gelpoint was 3 minutes at 85° C. Impregnation was carried out for 30 minutes at 2.5 atmospheres gauge. The wood took up 300 kg. of the monomer solution at 15° C.

The wood bundles were removed from the impregnating solution at 15° C. and introduced without creating turbulence into a water bath containing 1200 liter of water at 90° C., of a pH of 9 and of a viscosity of 3 cps. The water contained 1.5 g. per liter of a water soluble carboxyvinyl polymer or a polyoxyethylene with a molecular weight of 2-4 million (Carbopol 934).

The temperature of the water bath dropped within 2 minutes to 86° C. and gelation in the first 4 mm. of thickness of the wood was terminated in 4 minutes. The total separation of polymer by migration into the water bath 400 g. (0.14% of the impregnating monomer).

The temperature of the water bath was held at 85° C. for 25 minutes and then the temperature was permitted to rise by the exothermically generated heat to 90° C. This temperature peak was reached after 35 minutes and the polymer wood was withdrawn from the bath of 35 minutes and permitted to afterharden without cooling in a circulating air oven with humidified air at 85° C. for 3 hours.

EXAMPLE 5

Lamellae having a width of 20-70 mm, a thickness of 3-6 mm and a length of 90-320 mm are assembled in packets of 2-10 pieces with interposition of separating foils (Al 10-30 microns thick) with rubber bands. The packets has a thickness of 20-32 mm and were stacked as shown in the drawing and treated as in Example 4.

EXAMPLE 6

Production of vinyl-impregnated Eternite boards

30 Eternite boards (310 mm × 580 mm × 10 mm) each with a weight of 3.8 kg and a volume of 1.8 liters (grey or white Eternite) with a total weight of 115 kg and a total volume of 54 liters, were introduced into a frame with spacers having a height of 3 mm and a width of 8 mm. The vertically disposed, horizontally spaced mutually parallel boards were introduced into an impregnating vessel having a free bottom surface area of 380 mm × 600 mm. The stack was then subjected to evacuation for 10 minutes at 7 Torr. After evacuation 30 liters of a monomer solution were sucked into the impregnating vessel and impregnation was carried out at a pressure of 2-4 atmosphere gauge for 10-20 mm. The Eternite boards picked up 3.3-10 weight percent or 4.0-12 kg. of the monomer solution. The packing density can be calculated from the above given total volume of the Eternite boards and knowledge of the fact that the total volume of the vessel without the Eternite boards was 73 liters. The packing density is thus 88 weight percent.

The monomer solution consisted of 80-90% styreen and 10-20% unsaturated polyester (Viapal 485) or 10-20% cross-linkable divinylbenzene. The solution was catalysed with 0.2-0.5% P 1658, 0.6-15% lauroyl peroxide and 1% benzoyl peroxide, and 0.6% 1310.

0.5-2% of styrene-soluble hard wax such as paraffin wax, montan wax or bitumen with a melting point above 75° C.-105° C. could also be added. The gelpoint of monomer solution at 80°-85° C. was 3-4 minutes. The first 2 mm. of the thickness of the plates reach this temperature within a period less than 1 minute.

Polymerization of the plates is carried out in a water bath of 80 liters with water containing sufficient ammonium chloride to raise the boiling point of the water to 106° C. The boards at a temperature of 20° C. were introduced into the bath which was at a temperature of 100° C. The heating of the boards to 85° C. required 1700 kcal.

(1) $\Delta t = 65°$ C., specific heat 0.2 cal.g$^{-1}$ °C.$^{-1}$
   130 kg × 65° C. × 0.2 = 1700 kcal (2) Heat content of the bath
   $\Delta t = 15°$ C., specific heat 1.0 = 100 l
   100 × 15° C. × 1.0 = 1500 kcal (3) Heat of monomers 40-120 mol × 16.8 kcal/mol
   40 × 16.8 = 680 kcal
   120 × 16.8 = 1440 kcal.

Because of this heat relationship, the temperature of the water bath drops within 1 minute to about 88° C. and heat is then supplied for 10-15 minutes to maintain this temperature. The exothermically generated heat is then used to raise the temperature in the water to 102°-104° C. while the interior of the boards is exothermically heated to a temperature about 105° C.

After 10 minutes at a water temperature of 102° C. the hardening of the resin is terminated, and the boards are dipped in boiling water to wash the salt solution from the surface.

The treated Eternite plates, tested by immersion in water for 124 hours show a pickup of only 0.3-0.6% water. After 340 hours (15 days) this pickup reaches a maximum of 0.9%.

Untreated Eternite plates, in comparative testing show a pickup of 8-9% of water. The Eternite plates treated in accordance with the invention are more stable at temperatures below freezing, have a high strength and are substantially impermeable to water.

Boards and plates of this type can be produced by mass production techniques with low capital cost, with high outputs, with reduced chemical cost and like advantages over surface coating (e.g. with lacquers).

We claim:

1. A process for producing an impregnated article, comprising the steps of:
   impregnating a porous workpiece consisting predominantly of wood with a thermally activatable substantially hot-water-insoluble polymerizable solution capable of gelling and hardening within the pores of the workpiece; and
   thermally polymerizing said solution within the pores of said workpiece by immersing said workpiece after impregnation directly in a liquid heat carrier consisting predominantly of water and having a viscosity of at most 3 cps so that the heat carrier contacts surfaces of the workpiece impregnated with said solution and penetrates limitedly into said pores without significant removal of said solution from said pores, said heat carrier being at a temperature sufficient to effect chemical reaction of the solution within the pores of the workpiece.

2. The process defined in claim 1 wherein said workpiece is contacted with said heat carrier with a packing density upward of 50% and preferably upwards of 80%.

3. The process defined in claim 1 wherein said heat carrier is at a temperature and said solution is selected so that at most 15 minutes after contact of said heat carrier with the wood, further penetration of the heat carrier into the wood and passage of monomers out of the wood is substantially blocked.

4. The process defined in claim 3 wherein the temperature of said heat carrier is sufficient to heat the first 4 mm of the thickness of the wood to the gel temperature of the synthetic resin formed by said monomer within a period of 30-120 seconds.

5. The process defined in claim 3 wherein the temperature of said heat carrier is 20° C. to 30° C. above the threshold temperature of gelation of said solution so that gelling is effected in the first 6 mm of the wood in less than 6 minutes.

6. The process defined in claim 1 wherein said solution contains at least one catalyst for polymerization of the monomers in said solution.

7. The process defined in claim 6 wherein said catalyst has a threshold temperature of about 60° C. and is added to said solution in an amount of 0.2 to 2.0%, by weight, thereof and sufficient to effect gelation of the monomers in at least edge zones of the workpiece at a temperature of 80° to 85° C. within 1.5 to 5 minutes.

8. The process defined in claim 6 wherein said catalyst has a threshold temperature to 40° to 60° C. and is added in an amount of 0.05 to 0.4%, by weight, of the monomer solution and sufficient to impart gelation of said monomers in at least edge zones of said workpiece at a temperature of 80° to 95° C. within about 1.5 to 6 minutes.

9. The process defined in claim 6 wherein said solution contains 5 to 50%, by weight, of monomeric styrene, methylmethacrylate or high effective unsaturated polyesters to reduce the gel temperature and time of the solution to raise the viscosity thereof.

10. The process defined in claim 6 wherein said solution contains 3 to 10%, by weight, of crosslinkable bifunctional monomers selected from the group which consists of divinylbenzene, allylmethacrylate and 1,4-butanedioldimenthacrylate.

11. The process defined in claim 6 wherein the viscosity of said heat carrier at a temperature of 80° to 90° C. is greater than 1 cps.

12. The process defined in claim 11 wherein said heat carrier contains an amount up to 0.05%, by weight, of a viscosity-increasing substance having a molecular weight greater than one million and in an amount sufficient to raise the viscosity of said heat carrier up to about 2 cps.

13. The process defined in claim 6 wherein said heat carrier contains an accelerator in the form of an amine solution to promote polymerization in an edge zone of the workpiece.

14. The process defined in claim 6 further comprising the step of treating surfaces of the wood with ultraviolet radiation or high frequency low-penetration radiation for effecting partial closure of the pores of the wood and at least at surface zones thereof before contacting the wood with said heat carrier.

15. The process defined in claim 6 wherein said monomer solution contains a substance capable of increasing the surface tension of the solution relative to water.

16. The process defined in claim 6 wherein said heat carrier contains at least one boiling point increasing substance.

17. The process defined in claim 6, further comprising the step of covering at least one surface of the wood with a lacquer which can contain a polymerization catalyst or accelerator, prior to contacting the wood with said heat carrier.

18. The process defined in claim 6, further comprising the step of impregnating at least edge zones of the wood with a monomer solution containing an increased proportion of catalyst and accelerator so that the gel time at the edge zone is ¼ to 1/5 the gel time within the body of the wood.

19. The process defined in claim 18 wherein the main body of the wood is filled with a low-viscosity monomer solution and said edge zones are impregnated with higher viscosity solutions.

20. The process defined in claim 19 wherein the wood is impregnated with a monomer-containing solution to which is then added further catalyst and viscosity-increasing substances for further impregnation of the wood.

21. The process defined in claim 6, further comprising the step of removing the wood from contact with the heat carrier and permitting the wood to harden at a temperature of 110°–140° C. generated by exothermicity, the wood thereafter being tempered at a temperature of 70°–110° C.

22. The process defined in claim 6 wherein the catalyst quantity in said solution and the temperature of the heat carrier are selected so that the reaction within the interior of the wood is completed within a period of 10 to 30 minutes, the wood being removed when the reaction is exothermally generated heat and introduced into a heating chamber.

* * * * *